United States Patent [19]

Henningsson

[11] 4,399,671

[45] Aug. 23, 1983

[54] GREEN-HOUSE CURTAIN

[75] Inventor: Göran Henningsson, Kinna, Sweden

[73] Assignee: Ludvig Svensson (Holland) B.V., Ede, Netherlands

[21] Appl. No.: 203,907

[22] Filed: Nov. 4, 1980

[30] Foreign Application Priority Data

Nov. 19, 1979 [SE] Sweden .............................. 7909521
Feb. 28, 1980 [SE] Sweden .............................. 8001544

[51] Int. Cl.³ .............................................. D04B 7/04
[52] U.S. Cl. ........................................ 66/196; 66/202
[58] Field of Search ................... 66/87, 196, 190, 169, 66/170; 139/410, 384; 405/19; 428/120, 182, 253, 257

[56] References Cited

U.S. PATENT DOCUMENTS

| | | | |
|---|---|---|---|
| 2,072,152 | 3/1937 | Blake et al. | 139/384 |
| 2,632,480 | 3/1953 | MacIntyre | 139/410 |
| 2,803,268 | 8/1957 | MacIntyre | 139/410 |
| 2,848,018 | 8/1958 | Neisler | 139/410 |
| 3,008,213 | 11/1961 | Foster et al. | 139/410 |
| 3,048,198 | 8/1962 | Koppelman et al. | 139/410 X |
| 3,090,406 | 5/1963 | Koppelman et al. | 139/410 |
| 3,517,707 | 6/1970 | Hayes et al. | 139/410 |
| 3,538,957 | 11/1970 | Rheaume | 139/410 |
| 3,561,219 | 2/1971 | Nishizawa et al. | 66/196 X |
| 3,811,480 | 5/1974 | Villiger et al. | 139/384 |
| 3,864,944 | 2/1975 | Jackson | 66/196 |
| 4,128,684 | 12/1978 | Bomio et al. | 139/384 X |
| 4,230,057 | 10/1980 | Kurz | 66/202 |
| 4,280,342 | 7/1981 | Eng et al. | 66/196 |

FOREIGN PATENT DOCUMENTS

| | | | |
|---|---|---|---|
| 346525 | 3/1978 | Austria . | |
| 382758 | 10/1923 | Fed. Rep. of Germany . | |
| 1248249 | 8/1967 | Fed. Rep. of Germany . | |
| 2518702 | 10/1975 | Fed. Rep. of Germany . | |
| 2743614 | 4/1978 | Fed. Rep. of Germany | 66/196 |
| 604306 | 5/1960 | Italy | 66/170 |

*Primary Examiner*—Ronald Feldbaum
*Attorney, Agent, or Firm*—Holman & Stern

[57] ABSTRACT

A rollable and drapeable green-house curtain with insulating power. The curtain comprises double fabric layers separated along their entire length and width and interconnected by means of a plurality of thin and flexible threads sparsely distributed over the surface of the curtain. In the intervals between rows of connecting threads there could be arranged strips of a heat reflecting material, e.g. metallized foil, in order to make the curtain an effective barrier against radiant heat. The curtain is manufactured on a warp knitting machine with two needle bars and the connecting threads consist of connecting stitches between the double fabric paths.

17 Claims, 7 Drawing Figures

GREEN-HOUSE CURTAIN

TECHNICAL FIELD

The present invention refers to a double or multiple rollable and drapeable green-house curtain, the curtain layers of which being separated along their entire length and width but being interconnected by means of connecting members forming an air space therebetween.

BACKGROUND OF THE INVENTION

Curtains have been used as shading means in greenhouses successfully a number of years. the green-house curtain has replaced the previously common lime painting of the glass surfaces of the green-house, but has also involved other advantages. Thus it has been proved that the fall of cold air, which occurs when the ventilator doors are opened, is eliminated and a uniform ventilation and heat distribution is achieved. The sunshine entering through the open ventilator doors is stopped by the shading fabric, which is not the case with the common lime painting of the glass. As a result of this the supply of nutritive liquid to the plants can be kept more regular and at a lower level, at the same time as the difficult and risky job with the lime painting of the glass surfaces and also the removal of the paint, has been completely eliminated. The shading fabric has shown a way to regulate the climate of green-houses so that tolerable conditions for the staff and the plants are provided, which conditions have a direct influence upon the quantity and quality of the harvest. It is important that the green-house curtain can be moved, i.e. that it can be pulled up and draped, so that in a simple way it can be pulled across or aside for regulating the inlet of light at the same time as it should not be space-requiring when it is pulled up or draped.

The high costs for heating green-houses have forced demands for a better heat insulation, and wall facings with different types of foils alone or together with a ceiling covering of a shading curtain which hitherto have been used, have given relatively small heat savings. This mainly results from the low insulating power of these materials.

A heat insulating drapery is previously known through the Swedish Pat. No. 7504537-7, which rather discloses some type of a Venetian blind comprising a great number of axially interconnected hollow foil pieces, the longitudinal connection portions of which form the laths of the Venetian blind. It has been demonstrated that this drapery is not suitable in green-houses for many reason. One reason is that it cannot be draped, i.e. pulled together across the direction of the hollow foils, which is necessary because of the presence of different obstacles in a green-house, e.g. stiffening braces, irrigation tubes etc., which make it impossible to use draperys that can only be pulled or rolled up. It would of course be possible to arrange the drapery with the hollow foils vertically orientated, but in this case the natural thermal movement of the air will provide a flow of air in the hollow foils, which will eliminate the heat-insulating effect of the drapery. A further drawback is that it is difficult to connect the draperys tightly to each other, which means that a relatively high amount of heat can leak out between adjacent draperys. Another drawback is that the drapery is made of a plastic sheeting which is not water-transmitting. On the upper side of horizontally arranged draperys there can be so large an accumulation of condensing water that the draperys break and damage the plants.

The demands that should be made on a green-house curtain are as follows:
(1) it should have a high heat insulating capacity,
(2) it should be made of a soft, strong and pliable material,
(3) it should be rollable and drapeable,
(4) the curtain layers should, when the curtain is rolled up or draped, lie close to each other without being obstructed by any connecting members therebetween,
(5) it should be tight against thermal air flows,
(6) but it should not be water-tight so that water accumulates on it,
(7) it should be washable,
(8) it should have a low weight per unit of area,
(9) it should be possible to make it as an effective barrier against radiant heat.

This last demand has hitherto been impossible to fulfill simultaneously with the other demands, since good reflectors necessarily are very bright metallized surfaces, which do not have the softness and pliancy of e.g. a fabric. It would of course be possible to cover a soft, plastic foil material with a reflective layer, but if this is not absolutely smooth and bright the reflecting power is bad. A drawback of such materials that have a high reflecting power, as aluminized plastic foils and a similar materials, is their high tightness which make them similar to diffusion barriers, i.e. they have the opposite effect to what is required for green-house curtains.

SUMMARY OF THE INVENTION

The object of the present invention is to provide a green-house curtain which fulfills the demands stated above, even if the length of the curtain is twenty meters or more and extends along the ceiling of the greenhouse as well as along the walls thereof.

Another object is to provide a green-house curtain which is simple and cheap to manufacture and which is simple to put up and take down.

It should further be of a strong material, so that it can be laterally displaced by mechanical means. The new green-house curtain should have substantially the same high heat insulating power in horizontal, inclined or vertical position, since all these positions usually exist in one and the same green-house.

The objects of the invention are accomplished by the features that each connecting member consists of at least one thin and flexible thread extending between the curtain layers, said threads being sparsely distributed over substantially the whole surface of the curtain, so that the opposing surfaces of the curtain paths can be brought in close contact with each other.

The green-house curtain according to the invention can be manufactured by a warp knitting machine (a so called Rachel machine), by which each of the curtain layers is knitted of a pair of sets of individual warp yarns with the stitches of the knitted curtain path running in the direction of the ribs in the fabric, and that the curtain layers are connected to each other by means of cross-connections in the form of connecting stitches, so that one single composite product is achieved.

ADVANTAGES

Practical tests have proved that the green-house curtains which when pulled across, enclose the plants in a cultivation room separated from the surrounding greenhouse so effectively, that the unintentional ventilation through leaks in the building construction is kept outside the cultivation room, from which heat savings of about 70% have been achieved compared to greenhouses without curtains.

DESCRIPTION OF SOME EMBODIMENTS

Figure 1:
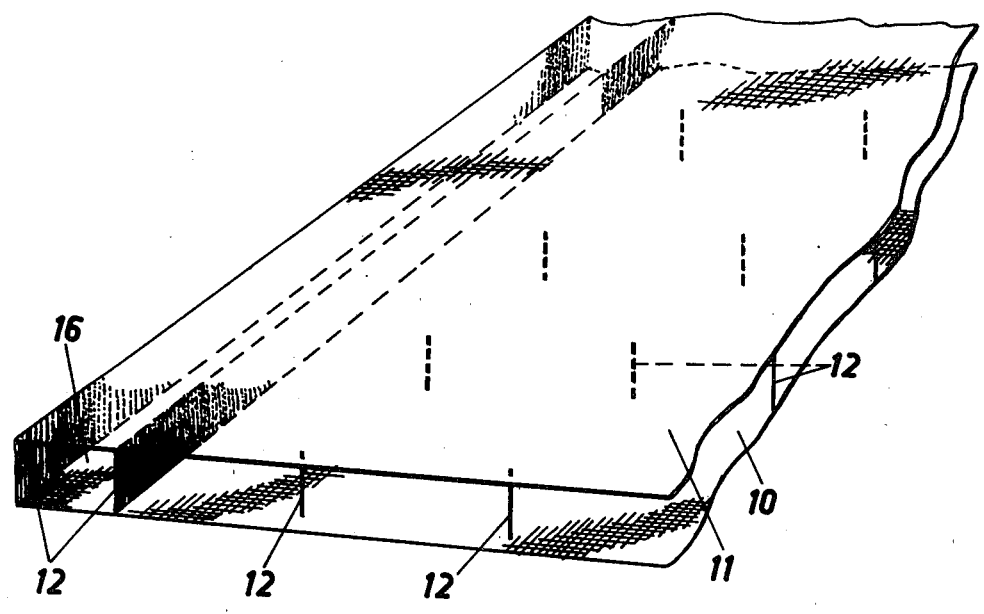
FIG. 1 is a perspective view of a piece of a greenhouse curtain according to the invention.
Figure 2:
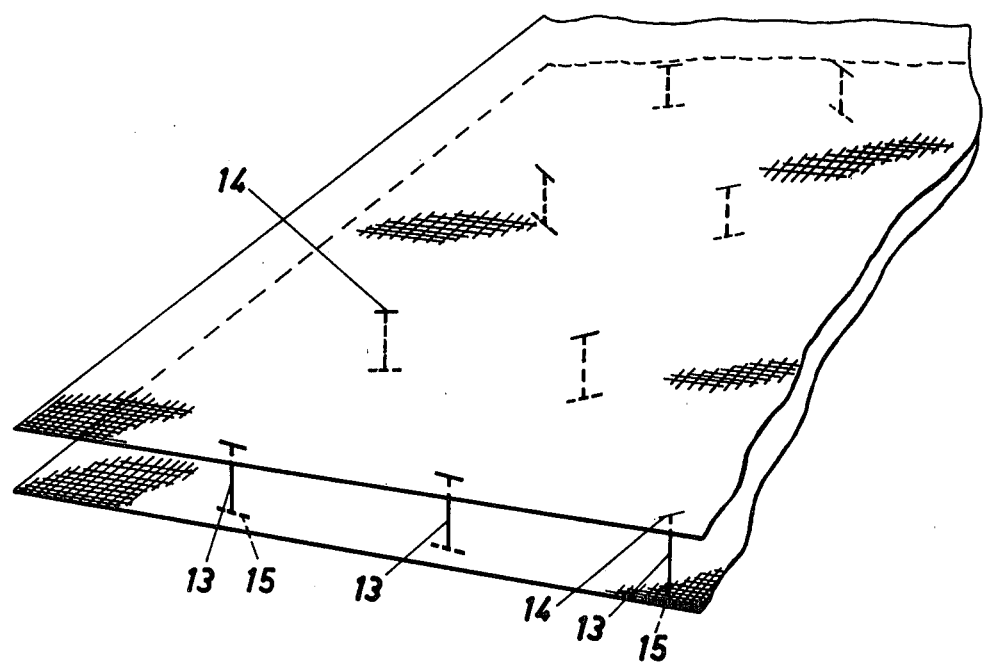
FIG. 2 is a perspective view of a modified embodiment of the invention.

The green-house curtain according to the invention comprises two curtain paths or layers 10 and 11 of a textile material, e.g. polyester, which has a very high resistance against light and moisture, a high tensile strength, does not shrink nor is attacked by microorganisms. The material can be washed in water with common detergents. The curtain layers 10 and 11 are provided along their surfaces which face each other with a great number of thin flexible threads 12, serving as connecting members. The threads 12 are, according to the embodiment of FIG. 2, arranged with relatively large spaces between each other. The threads 12 could also be arranged more closely, in parallel rows, e.g. along one side selvage of the curtain and thus form a channel 16 or a hem, through which a pull rod for handling the curtain can be passed. The distance between the threads 12 preferably exceeds the length of the threads, so that the entire thickness of the curtain layers 10 and 11, when the curtain is pulled up or draped, is not affected by the threads.

Many green-houses are today provided with a shading fabric, e.g. a single fabric layer, and it is often desirable that these shading fabrics also could be used for insulating purposes. The invention also provides a way for solving this problem. In order to achieve an improved insulating power for such a shading fabric, a second fabric layer 11 can be arranged opposite the first fabric layer 10, and the two fabric layers are then connected to each other by means of a great number of connecting members 12 of the kind shown in FIG. 2, and designated therein as members 13 uniformly distributed over the entire surfaces of the two fabric layers. These connecting members 13 consist of thin plastic stitching threads, which at each end are provided with cross-locking members 14 and 15. By means of a special leading-in tool one locking member 14 can be placed parallel to the waist of the member 13, which then can be passed through both fabric paths, after which the locking member 14 springs back to its initial cross position and is prevented from being pulled out of the fabric.

By choosing stitching threads 12 of different lengths the distance between the curtain paths can be varied. It is also possible during the summer months, when only a shading effect is desired, to cut off the stitching threads and ony use the shading web, and later, during the cold season, double the curtain for achieving an insulating power.

Figure 3:
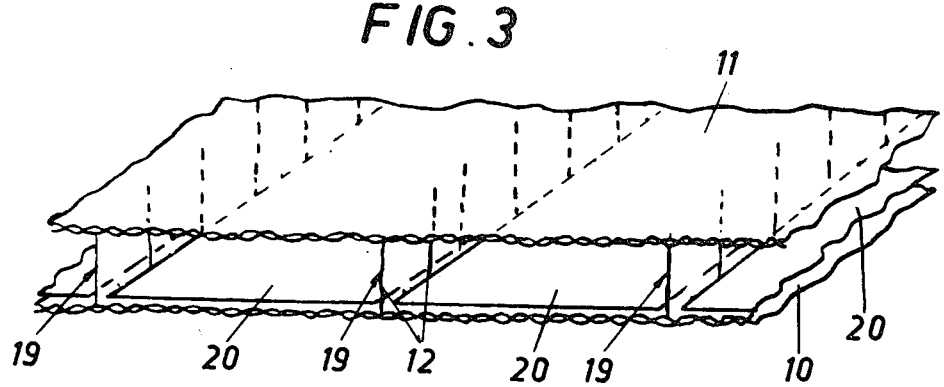
FIGS. 3–6 are perspective views of further embodiments of the green-house curtain according to the invention.

FIG. 3 discloses a fabric with the connecting members 12 spaced apart with relatively large intervals and with a relatively large interval between the rows 19 of connecting members. In he intervals between said rows 19, strips 20 are arranged which fill up essentially the whole free space between said rows. The strips 20 preferably comprise an aluminized plastic foil, but also other reflective coverings, of e.g. copper, nickel, silver or gold can be used.

Figure 4:
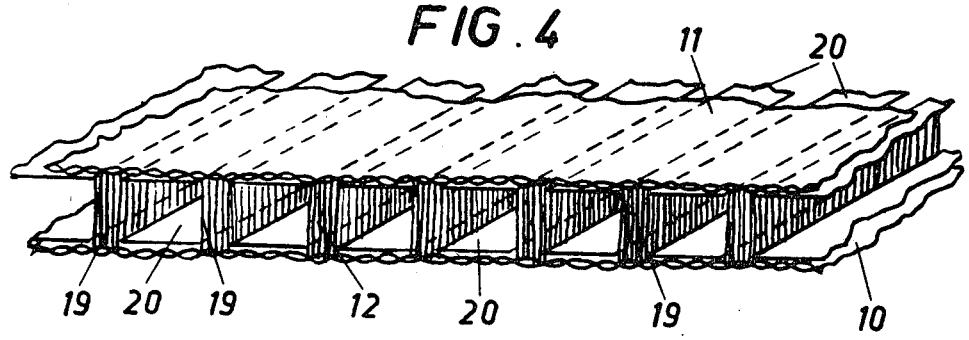

The embodiment shown in FIG. 4 has relatively narrow "streets" between the connecting threads 12, which are arranged in groups. This embodiment is preferred when the demands for pliability, flexibility and air circulation of the material, as well as reflecting power, are high. As can be seen from FIG. 4, there are arranged two strips 20 in each interval between the rows 19 of connecting threads, said strips lying close to the respective insides of the fabric layers 10 and 11.

Figure 5:
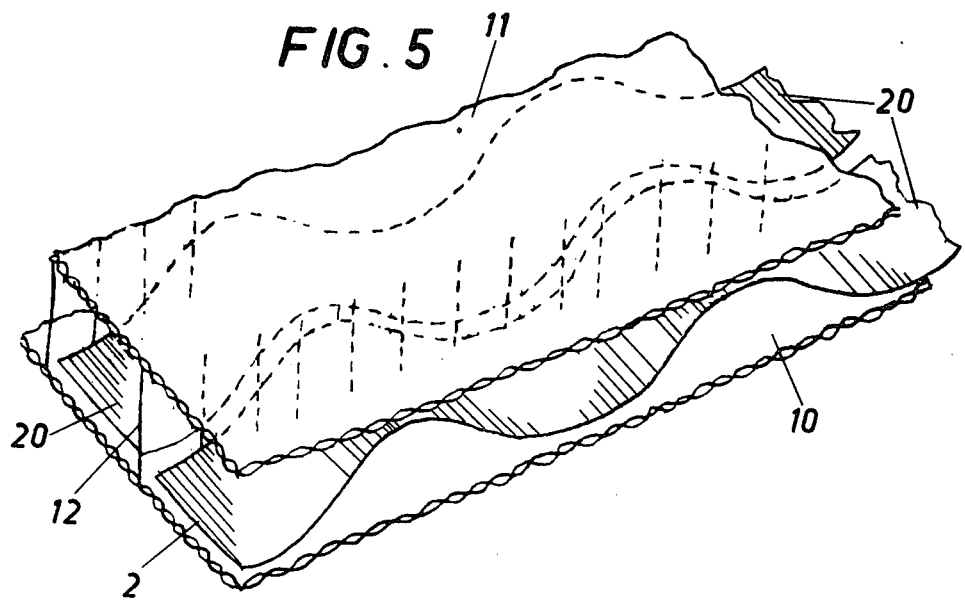

FIG. 5 shows an embodiment where the foil strips 20 are arranged with wave shape, at which the intervals are divided into a great number of spaces, which increases the heat insulating power when the curtain layers are spaced from each other.

Figure 6:
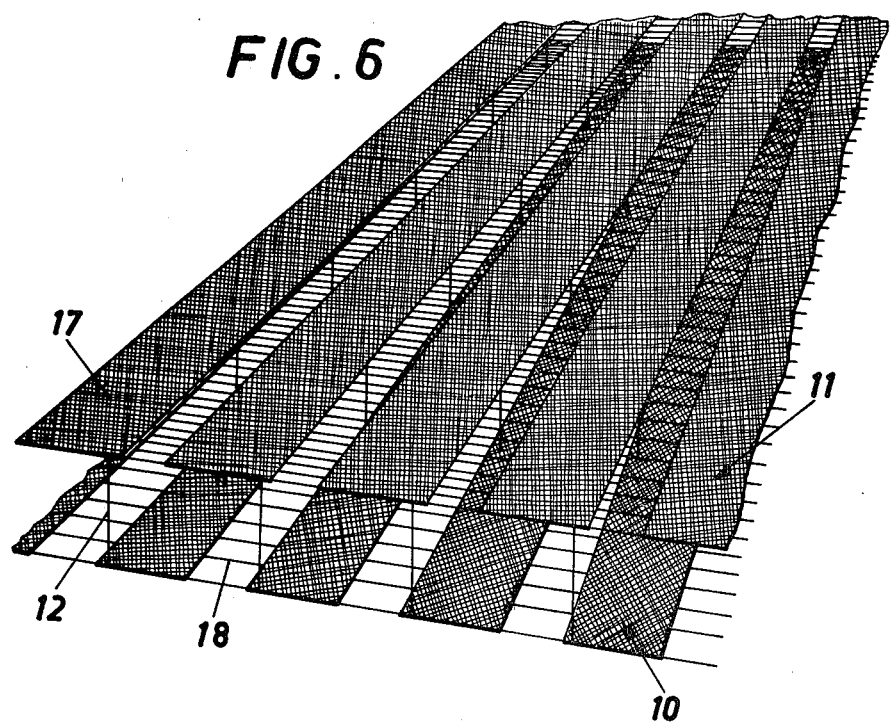

FIG. 6 shows an embodiment mainly intended as a shading means, i.e. preventing direct solar radiation against the plants. Both fabric layers 10 and 11 are divided into a plurality of longitudinal zones, in which every other zone consists of close or narrow mesh fabric 17 and alternate zones of loose or wide mesh fabric 18. The close zones 17 are broader, e.g. twice as broad as the loose zones 18. The fabric paths 10 and 11 are connected by means of connecting threads 12 extending between the close zones 17 of the two fabric paths 10 and 11. The fabric paths are so arranged relative to each other that a close zone 17 is arranged just opposite every loose zone 18.

A curtain of this specific design is an excellent shading means at the same time as it provides a good ventilation.

Figure 7:
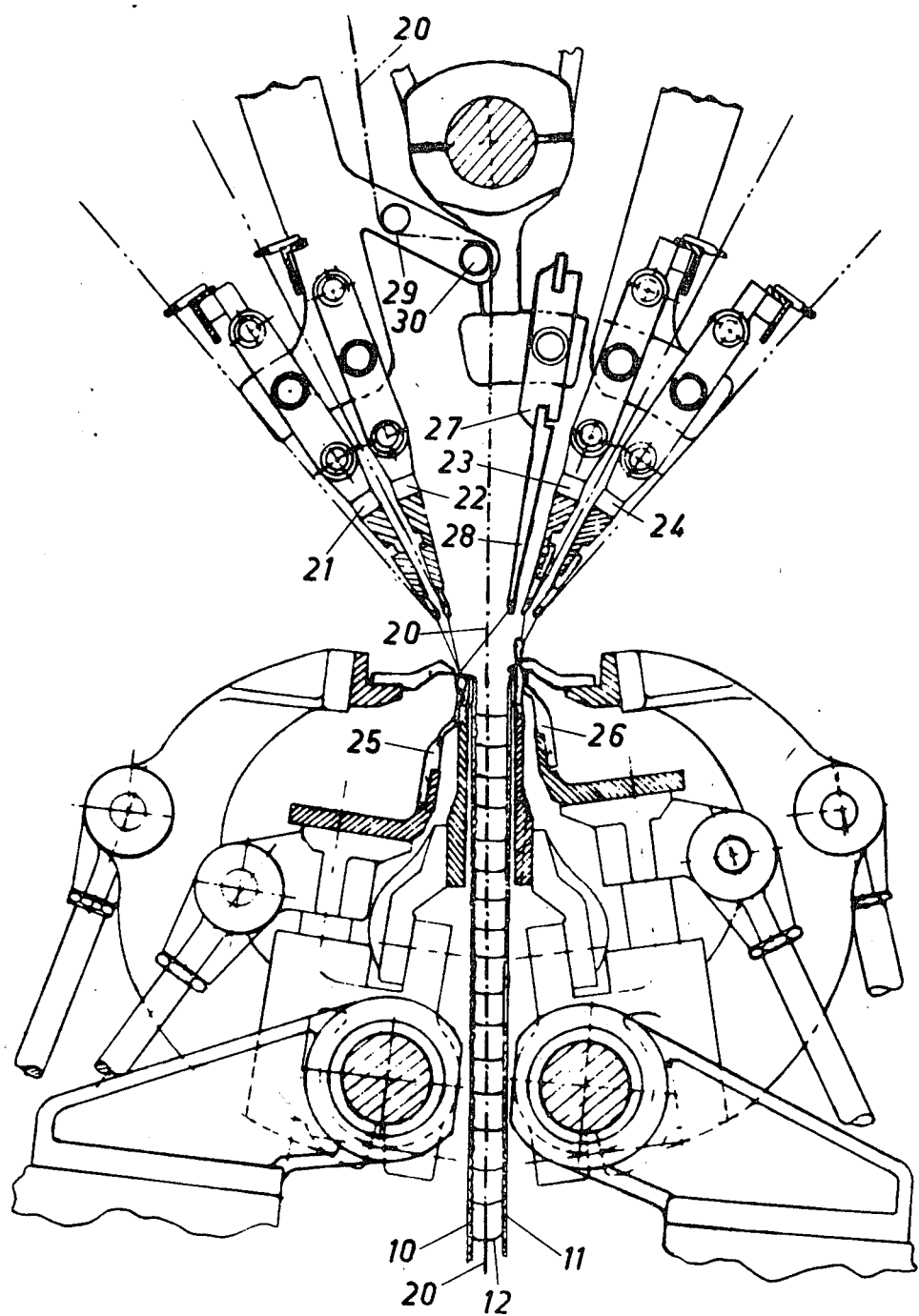
FIG. 7 is a section through a portion of a warp knitting machine with two needle bars for manufacturing a green-house curtain according to the invention.

The green-house curtain is manufactured in the way which can be seen from FIG. 7 by means of a substantially conventional warp knitting machine with two needle bars for making a double-faced fabric. It comprises e.g. four guide bars 21, 22, 23 and 24 arranged on fixed and/or swingable arms for providing a swinging movement across the needle bars 25 and 26. The needle bars are usually also swingable and thus a so called contra movement is performed, i.e. guide bars and needle bars are simultaneously swinging in different directions. In the embodiment of FIG. 7 the guide bars 21–24 are fixed while the guide bar 27 is swingable. The needle bars 25 and 26 are also swingable. Each guide bar is moveable to-and-fro on the swingable frame in parallel with the center of the needle bars and are controlled by a pattern chain (not shown), which cooperates with a pattern drum. The guide bars 21, 22 are used for knitting the fabric layer 10, while the guide bars 23, 24 are used for knitting the fabric layer 11. A fifth guide bar 27 is arranged between the above mentioned guide bars and is used for providing the cross connections 12. The guide bar 27 is provided with a number of thread guides 28 and the number corresponding to the number of rows 19 and in the space between said thread guides are, according to the invention, strips 20 of a foil material passing, which by way of pulley rollers 29 and 30 are led from a supply roller (not shown) to the center of the machine between the needle bars 25, 26.

Concurrently with the manufacture of the knitted fabric, i.e. the fabric layers 10 and 11 and the cross connections 12, the foil strips 20 are fed into the space between the fabric layers. The foil 20 is preferably cut in desired strips when it is fed to the center of the machine and the feeding is preferably made by means of driven feed rollers. For green-house curtains without reflective strips 20 these are of course excluded during manufacture. No other changes have to be made in other respects.

What I claim is:

1. A rollable and drapeable green-house curtain comprising:
   at least two fabric layers arranged in superposed spaced apart relation to the next adjacent layer and forming an air space therebetween;
   a plurality of connecting members each comprised of at least one thin, flexible plastic thread each end of which being provided with cross locking members, said thread extending between and connected at the opposed ends thereof to each superposed adjacent fabric layer, said connecting members being distributed over substantially the entire inner surfaces of the fabric layers and spaced apart by a distance greater than the lengths of said connecting members.

2. A green-house curtain according to claim 1, wherein the fabric layers consist of a knitted fabric of a textile water-transmitting material manufactured by a warp knitting machine with two needle bars and that the connecting members consist of cross connections in the form of connecting stitches between the fabrics layers.

3. A green-house curtain according to claim 1, wherein the curtain along at least one side edge is provided with a means for receiving a rod.

4. A green-house curtain according to claim 1, wherein said threads pass through both fabric layers so that the cross locking members are located at the remote surfaces of the fabric layers.

5. A green-house curtain according to claim 1, wherein each fabric layer comprises longitudinal zones of alternating narrow mesh fabric and wide mesh fabric, the fabric layers being so arranged relative to each other that narrow mesh fabric zones in one fabric layer are disposed in superposed relation to wide mesh fabric zones in an adjacent fabric layer.

6. A green-house curtain according to claim 5, wherein the narrow mesh fabric zones are broader than the wide mesh fabric zones, and the connecting threads are arranged between opposing portions of narrow mesh fabric zones.

7. The greenhouse curtain according to claim 3, wherein said receiving means comprises a channel.

8. The greenhouse curtain according to claim 3, wherein said receiving means comprises a hem.

9. The greenhouse curtain according to claim 3, wherein aid receiving means comprises a plurality of perforations.

10. The greenhouse curtain according to claim 1, wherein the number of fabric layers is two.

11. A double or multiple rollable and drapeable green-house curtain, the fabric layers of which are separated along their entire length and width but are interconnected by means of connecting members forming an air space therebetween, each connecting member consisting of at least one thin and flexible thread extending between the fabric layers, said threads being sparsely distributed over substantially the whole surface of the curtain, so that opposing surfaces of the fabric layers can be brought together in close contact with each other, and between the fabric layers there is arranged at least one heat reflecting layer.

12. A rollable and drapeable greenhouse curtain comprising:
    at least two fabric layers arranged in superposed spaced apart relation to the next adjacent layer and forming an air space therebetween;
    a plurality of connecting members each comprised of at least one thin, flexible thread extending between and connected at the opposed ends thereof to each superposed adjacent fabric layer, said connecting members being arranged in a plurality of parallel rows in the longitudinal direction of the fabric layers and having at least one strip of a heat reflecting material disposed in each interval between said rows.

13. The greenhouse curtain according to claim 12, wherein the number of heat reflecting strips is one.

14. A green-house curtain according to claim 12, wherein said strips consist of metallized foil.

15. A green-house curtain according to claim 12 or 14, wherein the length of the strips exceeds the length of the fabric layers and are arranged with a wave-shape formed between two fabric layers.

16. A green-house curtain according to claim 12, wherein the curtain along at least one side edge is provided with a means for receiving a rod.

17. The greenhouse curtain according to claim 16, wherein said receiving means comprises a channel.

* * * * *